US011842496B2

(12) United States Patent
Li et al.

(10) Patent No.: US 11,842,496 B2
(45) Date of Patent: Dec. 12, 2023

(54) REAL-TIME MULTI-VIEW DETECTION OF OBJECTS IN MULTI-CAMERA ENVIRONMENTS

(71) Applicant: Intel Corporation, Santa Clara, CA (US)

(72) Inventors: Qiang Li, Beijing (CN); Xiaofeng Tong, Beijing (CN); Yikai Fang, Beijing (CN); Chen Ling, Beijing (CN); Wenlong Li, Beijing (CN)

(73) Assignee: Intel Corporation, Santa Clara, CA (US)

( * ) Notice: Subject to any disclaimer, the term of this patent is extended or adjusted under 35 U.S.C. 154(b) by 171 days.

(21) Appl. No.: 17/251,195

(22) PCT Filed: Sep. 26, 2018

(86) PCT No.: PCT/CN2018/107498
§ 371 (c)(1),
(2) Date: Dec. 10, 2020

(87) PCT Pub. No.: WO2020/061792
PCT Pub. Date: Apr. 2, 2020

(65) Prior Publication Data
US 2021/0256245 A1 Aug. 19, 2021

(51) Int. Cl.
G06T 7/13 (2017.01)
H04N 13/282 (2018.01)
(Continued)

(52) U.S. Cl.
CPC .............. *G06T 7/13* (2017.01); *G06F 18/251* (2023.01); *G06V 10/803* (2022.01); *G06V 20/52* (2022.01);
(Continued)

(58) Field of Classification Search
CPC .... G06V 20/64; G06V 10/803; G06V 40/103; G06V 20/52; H04N 23/90; H04N 7/181;
(Continued)

(56) References Cited

U.S. PATENT DOCUMENTS 8,818,031 B1 * 8/2014 Kelly ..................... G06V 20/20
382/103
2009/0324009 A1 * 12/2009 Schulz ..................... G06T 7/73
382/103
(Continued)

FOREIGN PATENT DOCUMENTS

CN 1941850 A 4/2007
CN 101527042 9/2009
(Continued)

OTHER PUBLICATIONS

Sun. Luo, et al., "A Robust Approach for Person Localization in Multi-camera Environment 2010 20th International Conference on Pattern Recognition," Dec. 31, 2010 pp. 4036-4038. (Year: 2010).*
(Continued)

*Primary Examiner* — Kenny A Cese
(74) *Attorney, Agent, or Firm* — Jaffery Watson Mendonsa & Hamilton LLP

(57) ABSTRACT

A mechanism is described for facilitating real-time multi-view detection of objects in multi-camera environments, according to one embodiment. A method of embodiments, as described herein, includes mapping first lines associated with objects to a ground plane; and forming clusters of second lines corresponding to the first lines such that an intersection point in a cluster represents a position of an object on the ground plane.

15 Claims, 8 Drawing Sheets

(51) Int. Cl.
  *G06V 20/64*     (2022.01)
  *G06V 20/52*     (2022.01)
  *G06V 10/80*     (2022.01)
  *G06V 40/10*     (2022.01)
  *G06F 18/25*     (2023.01)

(52) U.S. Cl.
  CPC .............. *G06V 20/64* (2022.01); *G06V 40/103* (2022.01); *H04N 13/282* (2018.05)

(58) Field of Classification Search
  CPC ......... H04N 21/44008; H04N 21/4532; H04N 13/282; G06F 18/251; G06T 7/13
  USPC ........................................................ 382/103
  See application file for complete search history.

(56) References Cited

U.S. PATENT DOCUMENTS

| | | | |
|---|---|---|---|
| 2017/0142405 A1 | 5/2017 | Praxik | |
| 2017/0251197 A1* | 8/2017 | Willomitzer | ......... H04N 13/239 |
| 2018/0113672 A1* | 4/2018 | Klein | .................... G10L 15/183 |
| 2018/0356213 A1* | 12/2018 | Zheng | .................... G06T 5/006 |
| 2019/0139297 A1* | 5/2019 | Chen | ....................... G06F 18/22 |

FOREIGN PATENT DOCUMENTS

| | | |
|---|---|---|
| CN | 103700106 A | 4/2014 |
| DE | 112018008019 A1 | 7/2021 |
| WO | 2020/061792 A1 | 4/2020 |

OTHER PUBLICATIONS

Notification of Transmittal of the International Search Report and the Written Opinion of the International Searching Authority for PCT Application No. PCT/CN2018/107498 dated Jun. 24, 2019, 9 pages.

Sun, Luo, et al. A Robust Approach for Person Localization in Multi-camera Environment. 2010 20th International Conference on Pattern Recognition, Dec. 31, 2010, pp. 4036-4038.

Hu, Weiming, et al. Principal Axis-based Correspondence between Multiple Cameras for People Tracking. IEEE Transactions on Pattern Analysis and Machine Intelligence, Apr. 30, 2006, No. 4 vol. 28.

* cited by examiner

REAL-TIME MULTI-VIEW DETECTION OF OBJECTS IN MULTI-CAMERA ENVIRONMENTS

CLAIM OF PRIORITY

This application claims, under 35 U.S.C. § 371, the benefit of and priority to International Application No. PCT/CN2018/107498, filed Sep. 26, 2018, titled REAL-TIME MULTI-VIEW DETECTION OF OBJECTS IN MULTI-CAMERA ENVIRONMENTS, the entire content of which is incorporated herein by reference.

FIELD

Embodiments described herein relate generally to data processing and more particularly to facilitate real-time multi-view detection of objects in multi-camera environments.

BACKGROUND

There are several object detection techniques in the market today, but they are not without challenges. For example, with most conventional techniques, object occlusion is inherent, which leaves such techniques unreliable and error-prone. Further, most conventional techniques are not truly real-time in their operation or performance, nor are they capable of supporting large-scale camera systems.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

Figure 1:
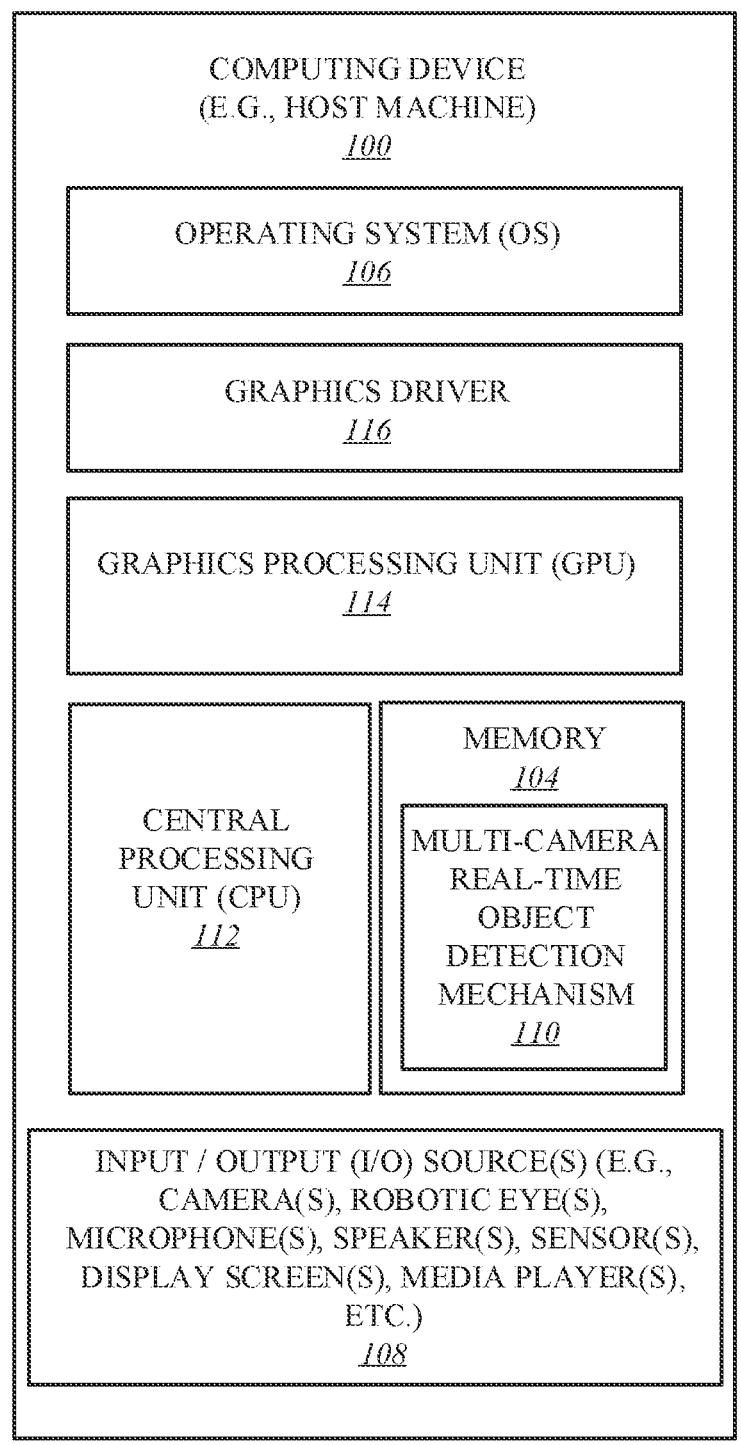
FIG. 1 illustrates a computing device employing a multi-camera real-time object detection mechanism according to one embodiment.

In the following description, numerous specific details are set forth. However, embodiments, as described herein, may be practiced without these specific details. In other instances, well-known circuits, structures and techniques have not been shown in detail in order not to obscure the understanding of this description.

Embodiments provide for a novel technique for real-time object detection in multi-camera systems. In one embodiment, a line-fusing-based multi-camera detection technique is employed to allow for associating all objects detected from different cameras and map them to a ground plane. This novel technique also allows for preventing or resolving any detection failures, such as false detections and miss-detections, etc.

It is contemplated and to be noted that embodiments are not limited to any form or type of objects and that they apply to all objects, including living beings and non-living things. Throughout this document, term "object" is referenced as inclusive of all living and non-living things and used interchangeably with "human", "person", "man", "woman", "child", etc. For example, embodiments are applicable to all objects, such as humans, animals, trees, geographic objects, celestial objects, weather systems, buildings, sports arenas, food, vehicles, equipment, tools, roads, mountains, oceans, and/or the like. For the sake of brevity, clarity, and ease of understanding, examples provided throughout this document involve humans and sporting events; however, as mentioned above, embodiments are not limited as such.

It is contemplated that terms like "request", "query", "job", "work", "work item", and "workload" may be referenced interchangeably throughout this document. Similarly, an "application" or "agent" may refer to or include a computer program, a software application, a game, a workstation application, etc., offered through an application programming interface (API), such as a free rendering API, such as Open Graphics Library (OpenGL®), DirectX® 11, DirectX® 12, etc., where "dispatch" may be interchangeably referred to as "work unit" or "draw" and similarly, "application" may be interchangeably referred to as "workflow" or simply "agent". For example, a workload, such as that of a three-dimensional (3D) game, may include and issue any number and type of "frames" where each frame may represent an image (e.g., sailboat, human face). Further, each frame may include and offer any number and type of work units, where each work unit may represent a part (e.g., mast of sailboat, forehead of human face) of the image (e.g., sailboat, human face) represented by its corresponding frame. However, for the sake of consistency, each item may be referenced by a single term (e.g., "dispatch", "agent", etc.) throughout this document.

In some embodiments, terms like "display screen" and "display surface" may be used interchangeably referring to the visible portion of a display device while the rest of the display device may be embedded into a computing device, such as a smartphone, a wearable device, etc. It is contemplated and to be noted that embodiments are not limited to any particular computing device, software application, hardware component, display device, display screen or surface, protocol, standard, etc. For example, embodiments may be applied to and used with any number and type of real-time applications on any number and type of computers, such as desktops, laptops, tablet computers, smartphones, head-mounted displays and other wearable devices, and/or the like. Further, for example, rendering scenarios for efficient performance using this novel technique may range from simple scenarios, such as desktop compositing, to complex scenarios, such as 3D games, augmented reality applications, etc.

It is to be noted that terms or acronyms like convolutional neural network (CNN), CNN, neural network (NN), NN, deep neural network (DNN), DNN, recurrent neural network (RNN), RNN, and/or the like, may be interchangeably referenced throughout this document. Further, terms like "autonomous machine" or simply "machine", "autonomous vehicle" or simply "vehicle", "autonomous agent" or simply "agent", "autonomous device" or "computing device", "robot", and/or the like, may be interchangeably referenced throughout this document.

FIG. 1 illustrates a computing device 100 employing a multi-camera real-time object detection mechanism ("detection mechanism") 110 according to one embodiment. Computing device 100 represents a communication and data processing device including or representing (without limitations) smart voice command devices, intelligent personal assistants, home/office automation system, home appliances (e.g., washing machines, television sets, etc.), mobile devices (e.g., smartphones, tablet computers, etc.), gaming devices, handheld devices, wearable devices (e.g., smartwatches, smart bracelets, etc.), virtual reality (VR) devices, head-mounted display (HMDs), Internet of Things (IoT) devices, laptop computers, desktop computers, server computers, set-top boxes (e.g., Internet-based cable television set-top boxes, etc.), global positioning system (GPS)-based devices, automotive infotainment devices, etc.

In some embodiments, computing device 100 includes or works with or is embedded in or facilitates any number and type of other smart devices, such as (without limitation) autonomous machines or artificially intelligent agents, such as a mechanical agents or machines, electronics agents or machines, virtual agents or machines, electro-mechanical agents or machines, etc. Examples of autonomous machines or artificially intelligent agents may include (without limitation) robots, autonomous vehicles (e.g., self-driving cars, self-flying planes, self-sailing boats, etc.), autonomous equipment (self-operating construction vehicles, self-operating medical equipment, etc.), and/or the like. Further, "autonomous vehicles" are not limed to automobiles but that they may include any number and type of autonomous machines, such as robots, autonomous equipment, household autonomous devices, and/or the like, and any one or more tasks or operations relating to such autonomous machines may be interchangeably referenced with autonomous driving.

Further, for example, computing device 100 may include a computer platform hosting an integrated circuit ("IC"), such as a system on a chip ("SoC" or "SOC"), integrating various hardware and/or software components of computing device 100 on a single chip.

As illustrated, in one embodiment, computing device 100 may include any number and type of hardware and/or software components, such as (without limitation) graphics processing unit ("GPU" or simply "graphics processor") 114, graphics driver (also referred to as "GPU driver", "graphics driver logic", "driver logic", user-mode driver (UMD), UMD, user-mode driver framework (UMDF), UMDF, or simply "driver") 116, central processing unit ("CPU" or simply "application processor") 112, memory 108, network devices, drivers, or the like, as well as input/output (I/O) sources 104, such as touchscreens, touch panels, touch pads, virtual or regular keyboards, virtual or regular mice, ports, connectors, etc. Computing device 100 may include operating system (OS) 106 serving as an interface between hardware and/or physical resources of the computing device 100 and a user.

It is to be appreciated that a lesser or more equipped system than the example described above may be preferred for certain implementations. Therefore, the configuration of computing device 100 may vary from implementation to implementation depending upon numerous factors, such as price constraints, performance requirements, technological improvements, or other circumstances.

Embodiments may be implemented as any or a combination of: one or more microchips or integrated circuits interconnected using a parentboard, hardwired logic, software stored by a memory device and executed by a microprocessor, firmware, an application specific integrated circuit (ASIC), and/or a field programmable gate array (FPGA). The terms "logic", "module", "component", "engine", "circuitry", "element", and "mechanism" may include, by way of example, software, hardware and/or a combination thereof, such as firmware.

In one embodiment, as illustrated, detection mechanism 110 may be hosted by memory 108 in communication with I/O source(s) 104, such as microphones, speakers, etc., of computing device 100. In another embodiment, detection mechanism 110 may be part of or hosted by operating system 106. In yet another embodiment, detection mechanism 110 may be hosted or facilitated by graphics driver 116. In yet another embodiment, detection mechanism 110 may be hosted by or part of graphics processing unit ("GPU" or simply graphics processor") 114 or firmware of graphics processor 114. For example, detection mechanism 110 may be embedded in or implemented as part of the processing hardware of graphics processor 114. Similarly, in yet another embodiment, detection mechanism 110 may be hosted by or part of central processing unit ("CPU" or simply "application processor") 112. For example, detection mechanism 110 may be embedded in or implemented as part of the processing hardware of application processor 112.

In yet another embodiment, detection mechanism 110 may be hosted by or part of any number and type of components of computing device 100, such as a portion of detection mechanism 110 may be hosted by or part of operating system 116, another portion may be hosted by or part of graphics processor 114, another portion may be hosted by or part of application processor 112, while one or more portions of detection mechanism 110 may be hosted by or part of operating system 116 and/or any number and type of devices of computing device 100. It is contemplated that embodiments are not limited to certain implementation or hosting of detection mechanism 110 and that one or more portions or components of detection mechanism 110 may be employed or implemented as hardware, software, or any combination thereof, such as firmware.

Computing device 100 may host network interface device(s) to provide access to a network, such as a LAN, a wide area network (WAN), a metropolitan area network (MAN), a personal area network (PAN), Bluetooth, a cloud network, a mobile network (e.g., $3^{rd}$ Generation (3G), $4^{th}$ Generation (4G), etc.), an intranet, the Internet, etc. Network interface(s) may include, for example, a wireless network interface having antenna, which may represent one or more antenna(e). Network interface(s) may also include, for example, a wired network interface to communicate with remote devices via network cable, which may be, for example, an Ethernet cable, a coaxial cable, a fiber optic cable, a serial cable, or a parallel cable.

Embodiments may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments may be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection).

Throughout the document, term "user" may be interchangeably referred to as "viewer", "observer", "speaker", "person", "individual", "end-user", and/or the like. It is to be noted that throughout this document, terms like "graphics domain" may be referenced interchangeably with "graphics processing unit", "graphics processor", or simply "GPU" and similarly, "CPU domain" or "host domain" may be referenced interchangeably with "computer processing unit", "application processor", or simply "CPU".

It is to be noted that terms like "node", "computing node", "server", "server device", "cloud computer", "cloud server", "cloud server computer", "machine", "host machine", "device", "computing device", "computer", "computing system", and the like, may be used interchangeably throughout this document. It is to be further noted that terms like "application", "software application", "program", "software program", "package", "software package", and the like, may be used interchangeably throughout this document. Also, terms like "job", "input", "request", "message", and the like, may be used interchangeably throughout this document.

Figure 2:
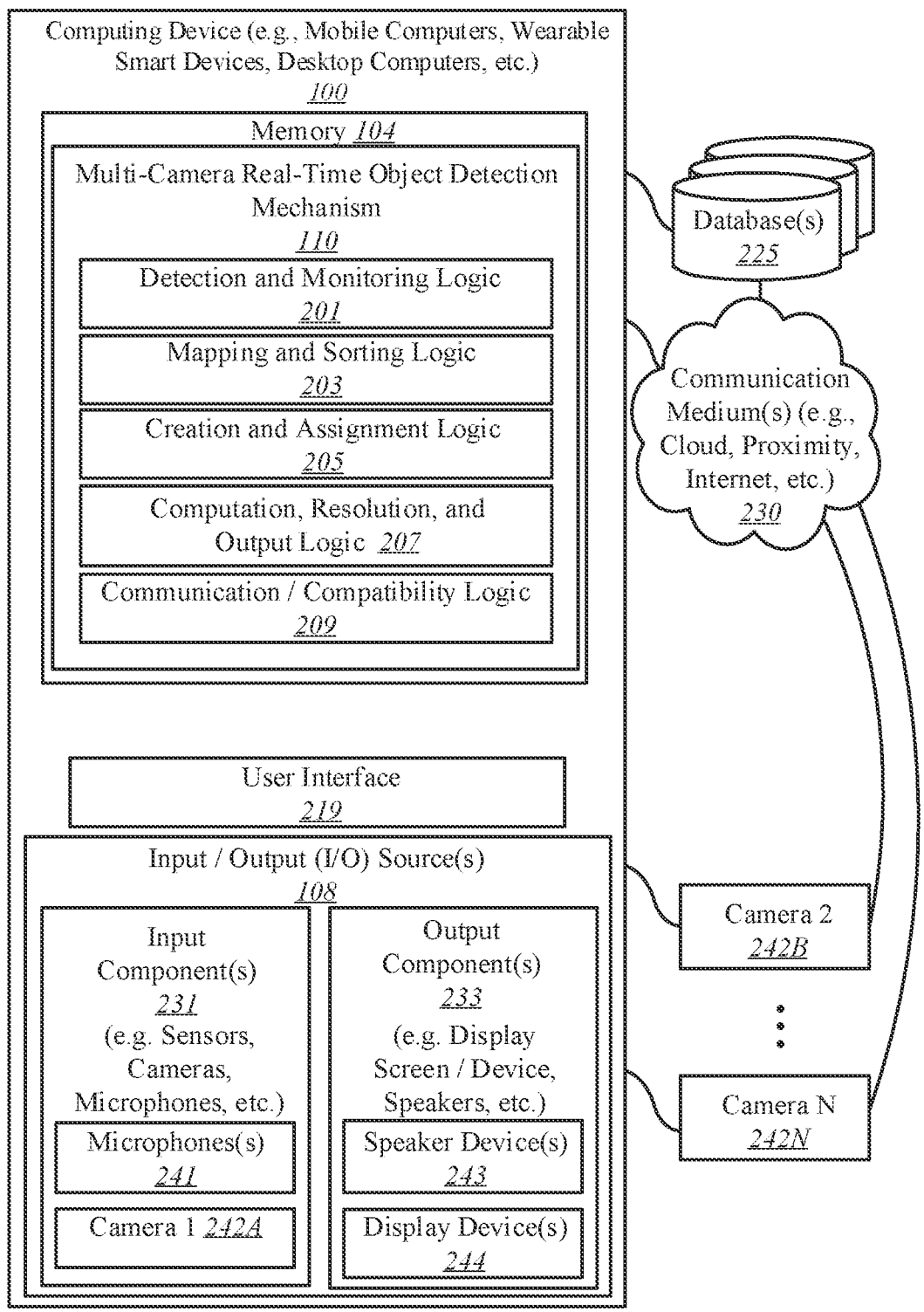
FIG. 2 illustrates a multi-camera real-time object detection mechanism according to one embodiment.

FIG. 2 illustrates multi-camera real-time object detection mechanism 110 of FIG. 1 according to one embodiment. For brevity, many of the details already discussed with reference to FIG. 1 are not repeated or discussed hereafter. In one embodiment, detection mechanism 110 may include any number and type of components, such as (without limitations): detection and monitoring logic 201; mapping and sorting logic 203; creation and assignment logic 205; computation, resolution, and output logic 207; communication/compatibility logic 209.

Computing device 100 is further shown to include user interface 219 (e.g., graphical user interface (GUI)-based user interface, Web browser, cloud-based platform user interface, software application-based user interface, other user or application programming interfaces (APIs), etc.). Computing device 100 may further include I/O source(s) 108 having input component(s) 231, such as camera 1 242A, camera 2 242B, and camera N 242N (e.g., Intel® RealSense™ camera), sensors, microphone(s) 241, etc., and output component(s) 233, such as display device(s) or simply display(s) 244 (e.g., integral displays, tensor displays, projection screens, display screens, etc.), speaker devices(s) or simply speaker(s), etc.

Computing device 100 is further illustrated as having access to and/or being in communication with one or more database(s) 225 and/or one or more of other computing devices over one or more communication medium(s) 230 (e.g., networks such as a proximity network, a cloud network, the Internet, etc.).

In some embodiments, database(s) 225 may include one or more of storage mediums or devices, repositories, data sources, etc., having any amount and type of information, such as data, metadata, etc., relating to any number and type of applications, such as data and/or metadata relating to one or more users, physical locations or areas, applicable laws, policies and/or regulations, user preferences and/or profiles, security and/or authentication data, historical and/or preferred details, and/or the like.

As aforementioned, computing device 100 may host I/O sources 108 including input component(s) 231 and output component(s) 233. In one embodiment, input component(s) 231 may include a sensor array including, but not limited to, microphone(s) 241 (e.g., ultrasound microphones), camera 1 242A, 2 242B, N 242N (e.g., two-dimensional (2D) cameras, three-dimensional (3D) cameras, infrared (IR) cameras, depth-sensing cameras, etc.), capacitors, radio components, radar components, scanners, and/or accelerometers, etc. Similarly, output component(s) 233 may include any number and type of display device(s) 244, projectors, light-emitting diodes (LEDs), speaker(s) 243, and/or vibration motors, etc.

As aforementioned, terms like "logic", "module", "component", "engine", "circuitry", "element", and "mechanism" may include, by way of example, software or hardware and/or a combination thereof, such as firmware. For example, logic may itself be or include or be associated with circuitry at one or more devices, such as application processor 112 and/or graphics processor 114 of FIG. 1, to facilitate or execute the corresponding logic to perform certain tasks.

For example, as illustrated, input component(s) 231 may include any number and type of microphones(s) 241, such as multiple microphones or a microphone array, such as ultrasound microphones, dynamic microphones, fiber optic microphones, laser microphones, etc. It is contemplated that one or more of microphone(s) 241 serve as one or more input devices for accepting or receiving audio inputs (such as human voice) into computing device 100 and converting this audio or sound into electrical signals. Similarly, it is contemplated that one or more of camera 1 242A, 2 242B, N 242N serve as one or more input devices for detecting and capturing of image and/or videos of scenes, objects, etc., and provide the captured data as video inputs into computing device 100.

As described earlier, there are several challenges with conventional multi-camera object detection techniques, such as occlusion of objects, which leads to such techniques being unreliable, error-prone, and less accurate. Further, such conventional techniques are not truly operated or performed in real-time, nor are they capable of supporting large camera systems.

Embodiments provide for a novel technique that supports multi-camera detection of objects that is operated or performed in real-time and provides for reliable, error-free, and accurate results. Further, this novel technique allows for supporting large scale camera systems, as will be further described throughout this document.

As illustrated, multiple cameras of this novel multi-camera technique may include any number and type of cameras, such as cameras 242A, 242B, 242N. Further, as illustrated, these cameras 242A, 242B, 242N may be in communication with computing device 100 in a number of ways, such as camera 242A is shown as being part of or embedded in computing device 100, while cameras 242B and 242N may be directly coupled to computing device 100 or in communication with computing device 100 over communication medium(s) 230, such as a cloud network, the Internet, a proximity network, etc. Embodiments are not limited to the illustrated structure or setup of FIG. 2 and that this system structure or architecture setup may be employed or formed in varying manners.

Embodiments provide for a novel technique for high-resolution video data capture of scenes with multiple cameras, such as cameras 1 242A, 2 242B, N 242N, to generate volumetric three-dimensional (3D) models that can offer immersive user experience, such as in case of sporting events. This novel technique provides for real-time camera path control, automatic object data analysis, etc., while detecting objects, such as persons, from multiple high-resolution cameras. Further, this novel technique allows for detecting, capturing, and analyzing of all objects, such as persons, from multiple high-resolution cameras without any of the normal occlusions or failures.

In one embodiment, multi-camera object detection may involve multi-camera geometric constrains and fusing-based analysis. Multi-camera geometric constraints are based on geometric constraints using mapping between a ground plane and camera views. The common used features are point, line, binary mask, and pixel values, where they normally perform pair-wise camera correspondence association and then fuse pair-wise results. Further, in case of deep learning-based multi-view detection, multi-view information is used to improve object detection results, where any outer layers are trained for multi-view appearances-based joint detection.

Some of the conventional techniques focus too much on how to improve the detection performance in a single view of a person by leveraging multi-view data, but this fails to improve the person's presence across multiple views or address any occlusion problems. Further, such conventional technique can be rather costly due to inference times, etc.

Other conventional techniques consider only pair-wise camera correspondence for a small number of camera settings (e.g., normally less than 10) and pair-wise camera processing, which results in latter stages. Such conventional techniques fail to scale well and do not work well with large-scale multi-camera settings. Further, the computational cost for such conventional techniques is rather high and creates ambiguity in ground plane person mapping, where the methods are not capable of obtaining global optimum results. Moreover, such techniques only use features relating to detected bounding boxes, where the bounding box centers are not the foot centers, which leads to additional multi-cam person detection failures.

Embodiments provide for a novel technique for allowing a principal line fusing-based multi-camera object detection technique, where objects (e.g., persons, things, etc.) are associated with each other and other objects in the scene detected from different camera views, such as using cameras 242A, 242B, 242N, and mapping the objects, based on the associations, to a ground plane, as facilitated by detection mechanism 110. This novel technique further allows for resolving any object-detection failures involving false detections, missed detections, etc.

In one embodiment, as facilitated by detection mechanism 110, objects are grouped in a ground plane and any distance between a principal line and an object group is used as the metric to determine correspondence between objects, such as persons. Further, as opposed to using the conventional pair-wise camera techniques, embodiments provide for selection of an observation of a single camera of camera, such as camera 242B, and then add up the observations of other cameras, such as cameras 242A, 242C, and 242N, one-by-one in a detection process. Further, global optimum is achieved by minimizing a pair sum of the corresponding distance for various pairs of the principal lines and the object groups, as facilitated by detection mechanism 110.

This novel technique provides for supporting and accurate workings of large-scale multi-camera systems over conventional techniques. Further, embodiments are not limited to any type or numbers of cameras and that cameras 242A, 242C, and 242N are merely illustrated for brevity and that embodiments are not limited to them or as such. For example, CRO logic 207 may employ O(N) computation complexity, where N refers to the number of cameras, allowing for fast computation.

Further, this novel multi-camera object detection allows for automatic multi-camera tracking of objects in a scene, such as persons, through detection and monitoring logic 201, while enabling novel usages and applications, such as real-time camera path control, advanced game analytics, etc.

As illustrated and described with reference to method 400 of FIG. 4, at block 401, multiple camera inputs 401, 403, and 405 from cameras 242A, 242B, 242N, respectively, may be received, as facilitated by detection and monitoring logic 201, where each input of inputs 401, 403, 405 refers to an observation and capture of a scene by a corresponding camera of cameras 242A, 242B, 242N, where the scene includes objects ranging from living beings (e.g., humans) to non-living things (e.g., rocks) and throughout indoors (e.g., within a room) and outdoors (e.g., in open space), etc.

Figure 4:
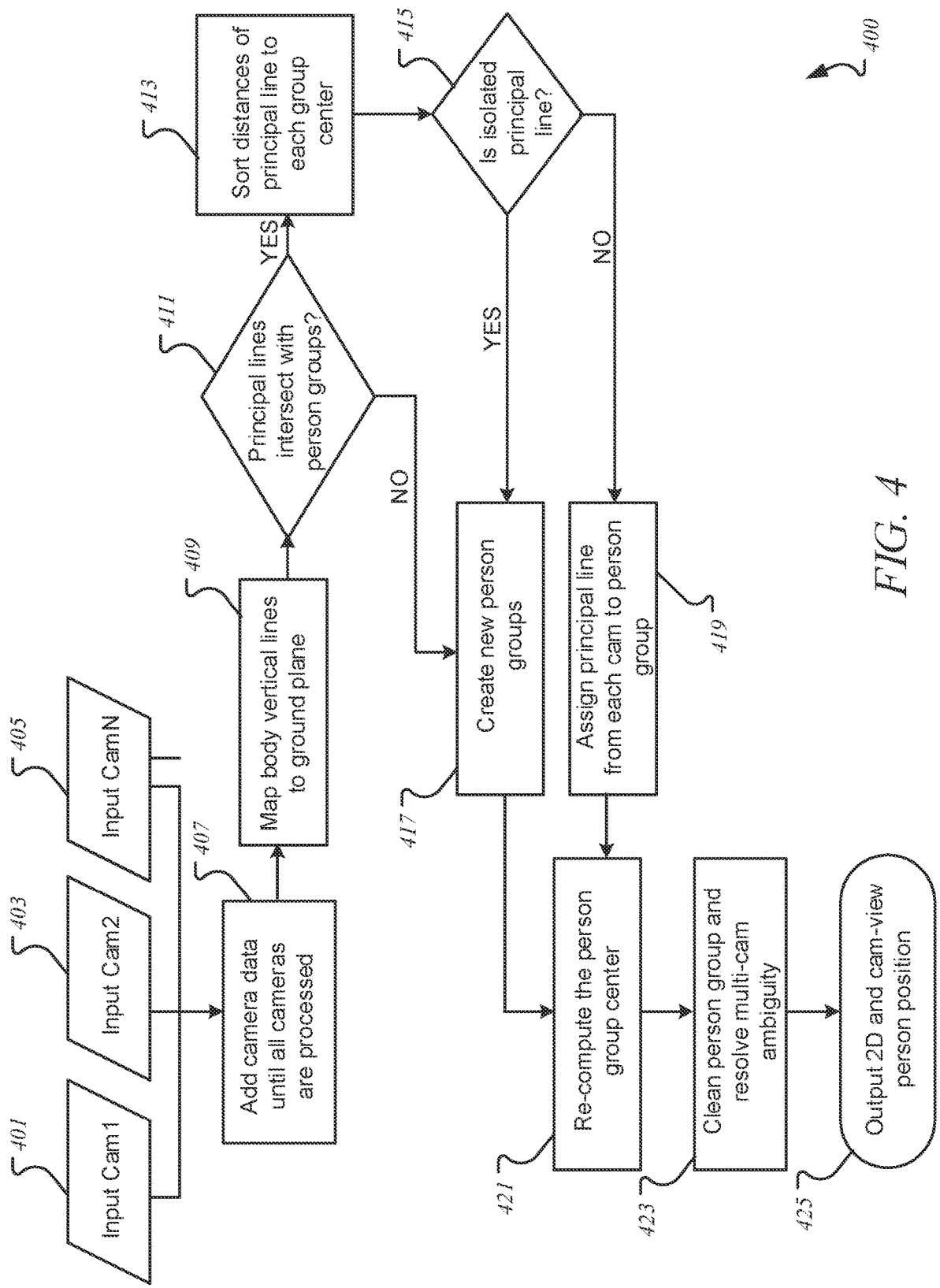
FIG. 4 illustrates an embodiment of a method for performing a real-time multi-view, multi-camera detection of objects according to one embodiment.

In one embodiment, once inputs 401, 403, 405 are received by detection and monitoring logic 201, any sets of data captured through these inputs 401, 403, 405 are then added up until all camera inputs 401, 403, 405 are processed at block 407 of FIG. 4, as facilitated by detection and monitoring logic 201.

In one embodiment, mapping and sorting logic 203 is then triggered to map body vertical lines to ground plane, as illustrated in block 409 of FIG. 4. As further illustrated with reference to FIG. 3A, a vertical line is defined as the vertical path across the center of an object, such as from the head down to the foot center of a person for each person in each camera view, as facilitated by mapping and sorting logic 203. Further, in one embodiment, each principal line corresponding to each vertical line represents a vertical line mapping to a ground plane, such as after a homography transform, as facilitated by mapping and sorting logic 203. For example, if a person's feet are on the ground, then the foot centers would also be on the ground and in such a case, all foot centers associated with all persons as viewed from different cameras, such as cameras 242A, 242B, 242N, are mapped to the same point in the ground plane, as facilitated by mapping and sorting logic 203, indicating that the principal lines in the ground plane intersect at the same point or position, referred to as an intersecting point as shown with respect to FIG. 3A.

In one embodiment, mapping and sorting logic 203 is triggered to determine whether all principal lines intersect with person groups as shown with respect to block 411 of FIG. 4. For example, after cameras 242A, 242B, 242N are used to do principal line correlation with existing M person grouping a ground plane. Now suppose there are N persons with principal lines $P^j_1, \ldots, P^j_N$ in camera j (e.g., camera 242B) then to determine whether a principal line from camera j has correlation with a person group, this principal line performs line crossing with all existing principal lines in this person group. If either pair of lines has intersection, it is then determined to have correspondence to this person group, as facilitated by mapping and sorting logic 203.

In one embodiment, a camera, such as camera 2 242B, is first chosen for input and then inputs from all other cameras, such as camera 1 242A, camera N 242N, are one-by-one added to the total. Suppose there are M persons with principal line $P^i_1, \ldots, P^i_M$ in the first camera i, then these principal lines may generate M person groups in the ground plane, where the foot point in each person group is regarded as the foot center of each principal line.

Further, mapping and sorting logic 203 to sort distances of principal lines to each group center and perform line-group mapping, as shown with respect to block 413 of FIG. 4. For example, any correspondence distance between principal lines and person groups is computed CRO logic 207, where one principal line from camera j (e.g., camera 2 242B) may have correspondence with several person groups, then a list of p pairs of principal line $P^i_M$ and person group $G^j_n$ are generated by CRO logic 207.

Further, mapping and sorting logic 203 is used to find mapping pairs (such as pairs between principal lines and person groups) where a pair sum of the correspondence distance is minimum, it is represented using the following formula, where each principal line can only be assigned in one existing person group or a new person group (e.g., D for new person group assignment uses a fixed value):

$$\lambda = \operatorname*{argmin}_{p}\left(\sum_{w=1}^{m}\left(D\left(P^i_w, G^j_{p_w}\right)\right)\right)$$

Further, as illustrated with reference to intersection 340 of FIG. 3B, one principal line $P^j_1$ 341 from camera j (e.g., camera 2 242B) is shown as intersecting with multiple person groups, such as two person groups $G_1$ 351 and $G_2$ 353. Further, as shown in FIG. 3B, the correspondence distance of $[G_1, P^j_1]$ is smaller than $[G_2, P^j_1]$, where $[G_1, P^j_1]$ has the correspondence and represents the same person in these two cameras, and $P^j_1$ is in new $G_1$ group (consisting two principal lines). The $G_1$ 351 new group center may be updated by using means of all intersection points in the same person group.

Further, at block 415 of FIG. 4, another determination is made as to whether there is a principal line that is regarded as isolated. At this point, in one embodiment, creation and assignment logic 205 is triggered as, for example, if there are not more isolated lines, then a principal line from each of cameras 242A, 242B, 242N is assigned to the person group as facilitated by creation and assignment logic 205 and as illustrated with respect to block 419 of FIG. 4.

If, however, in another embodiment, if there are any isolated principal lines, then creation and assignment logic 205 is triggered to create a new person group as illustrated with respect to block 417 of FIG. 4. For example, in addition, if there are any isolated principal lines from a certain camera, such as camera 2 242B, without any intersecting with any of the existing person groups, then by default, creation and assignment logic 205 is triggered to form a new person group.

In either case, such as whether a principal line is assigned from each camera 242A, 242B 242N, to each person group or new person groups are created at block 417 and block 419, respectively of FIG. 4, CRO logic 207 is then used to re-compute the person group center at block 421 of FIG. 4. This is followed by cleaning up of person groups and resolving of any multi-camera ambiguities by CRO logic 207 and at block 423 of FIG. 4. Subsequently, images (e.g., two-dimensional (2D) images), camera view-based objects positions, etc., may then be outputted as results by CRO logic 207 and at block 425 of FIG. 4.

Further to the clean up and resolution processes of block 423 of FIG. 4, in one embodiment, after all the object groups (e.g., person groups referring to persons) are ready, CRO logic 207 performs post-processing based on any prior or historical knowledge. For example, if each person (e.g., players on a soccer field, people in seats at a theater, sellers at a market, etc.) is observed by at least 3 cameras and given the high accuracy of this novel technique in terms of both recall and precision, any person groups with less than a predetermined threshold accuracy (e.g., 2 principal lines) may be eliminated, as facilitated by CRO logic 207. This filtering or clean up process reduces or even eliminates any false positive detection impact. Similarly, for occluded cases, when certain cameras are not capable of providing accurate results, CRO logic 207 may be triggered to obtain better results from any given assessment and multi-camera detection, such as by correctly estimating the persons' positions in 2D ground plane, as shown in FIG. 3B.

As described earlier, embodiments are not limited to any type or number of cameras. For example, a sporting area, such as a football stadium, may employ varying types of tens of cameras around the facility, where from each camera can provide a unique view or perspective of an object, such as player on the field, etc., as facilitated by detection and monitoring logic 201. Similarly, detection and monitoring logic 201 may be used to detect all the landmark points, such as 14 landmark points, for each person using any number of techniques. Further, for example, a landmark between the left angle and the right ankle of a person may be used as a center position for the entire body of that person.

It is contemplated that embodiments are not limited to any number or type of microphone(s) 241, cameras 1 242A, 2 242B, N 242N, speaker(s) 243, display(s) 244, etc. For example, as facilitated by detection and monitoring logic 201, one or more of microphone(s) 241 may be used to detect speech or sound simultaneously from users, such as speakers. Similarly, as facilitated by detection and monitoring logic 201, one or more of camera(s) 242 may be used to capture images or videos of a geographic location (whether that be indoors or outdoors) and its associated contents (e.g., furniture, electronic devices, humans, animals, trees, mountains, etc.) and form a set of images or a video stream.

Similarly, as illustrated, output component(s) 233 may include any number and type of speaker(s) or speaker device(s) 243 to serve as output devices for outputting or giving out audio from computing device 100 for any number or type of reasons, such as human hearing or consumption. For example, speaker(s) 243 work the opposite of microphone(s) 241 where speaker(s) 243 convert electric signals into sound.

Further, input component(s) 231 may include any number and type of cameras 1 242A, 2 242B, N 242N, such as depth-sensing cameras or capturing devices (e.g., Intel® RealSense™ depth-sensing camera) that are known for capturing still and/or video red-green-blue (RGB) and/or RGB-depth (RGB-D) images for media, such as personal media. Such images, having depth information, have been effectively used for various computer vision and computational photography effects, such as (without limitations) scene understanding, refocusing, composition, cinemagraphs, etc. Similarly, for example, displays may include any number and type of displays, such as integral displays, tensor displays, stereoscopic displays, etc., including (but not limited to) embedded or connected display screens, display devices, projectors, etc.

Input component(s) 231 may further include one or more of vibration components, tactile components, conductance elements, biometric sensors, chemical detectors, signal detectors, electroencephalography, functional near-infrared spectroscopy, wave detectors, force sensors (e.g., accelerometers), illuminators, eye-tracking or gaze-tracking system, head-tracking system, etc., that may be used for capturing any amount and type of visual data, such as images (e.g., photos, videos, movies, audio/video streams, etc.), and non-visual data, such as audio streams or signals (e.g., sound, noise, vibration, ultrasound, etc.), radio waves (e.g., wireless signals, such as wireless signals having data, metadata, signs, etc.), chemical changes or properties (e.g., humidity, body temperature, etc.), biometric readings (e.g., figure prints, etc.), brainwaves, brain circulation, environmental/weather conditions, maps, etc. It is contemplated that "sensor" and "detector" may be referenced interchangeably throughout this document. It is further contemplated that one or more input component(s) 231 may further include one or more of supporting or supplemental devices for capturing and/or sensing of data, such as illuminators (e.g., IR illuminator), light fixtures, generators, sound blockers, etc.

It is further contemplated that in one embodiment, input component(s) 231 may further include any number and type of context sensors (e.g., linear accelerometer) for sensing or detecting any number and type of contexts (e.g., estimating horizon, linear acceleration, etc., relating to a mobile computing device, etc.). For example, input component(s) 231 may include any number and type of sensors, such as (without limitations): accelerometers (e.g., linear accelerometer to measure linear acceleration, etc.); inertial devices (e.g., inertial accelerometers, inertial gyroscopes, microelectro-mechanical systems (MEMS) gyroscopes, inertial navigators, etc.); and gravity gradiometers to study and measure variations in gravitation acceleration due to gravity, etc.

Further, for example, input component(s) 231 may include (without limitations): audio/visual devices (e.g., cameras, microphones, speakers, etc.); context-aware sensors (e.g., temperature sensors, facial expression and feature measurement sensors working with one or more cameras of audio/visual devices, environment sensors (such as to sense background colors, lights, etc.); biometric sensors (such as to detect fingerprints, etc.), calendar maintenance and reading device), etc.; global positioning system (GPS) sensors; resource requestor; and/or TEE logic. TEE logic may be employed separately or be part of resource requestor and/or an I/O subsystem, etc. Input component(s) 231 may further include voice recognition devices, photo recognition devices, facial and other body recognition components, voice-to-text conversion components, etc.

Similarly, output component(s) 233 may include dynamic tactile touch screens having tactile effectors as an example of presenting visualization of touch, where an embodiment of such may be ultrasonic generators that can send signals in space which, when reaching, for example, human fingers can cause tactile sensation or like feeling on the fingers. Further, for example and in one embodiment, output component(s) 233 may include (without limitation) one or more of light sources, display devices and/or screens, audio speakers, tactile components, conductance elements, bone conducting speakers, olfactory or smell visual and/or non/visual presentation devices, haptic or touch visual and/or non-visual presentation devices, animation display devices, biometric display devices, X-ray display devices, high-resolution displays, high-dynamic range displays, multi-view displays, and head-mounted displays (HMDs) for at least one of virtual reality (VR) and augmented reality (AR), etc.

It is contemplated that embodiment are not limited to any number or type of use-case scenarios, architectural placements, or component setups; however, for the sake of brevity and clarity, illustrations and descriptions are offered and discussed throughout this document for exemplary purposes but that embodiments are not limited as such. Further, throughout this document, "user" may refer to someone having access to one or more computing devices, such as computing device 100, and may be referenced interchangeably with "person", "individual", "human", "him", "her", "child", "adult", "viewer", "player", "gamer", "developer", "programmer", and/or the like.

Communication/compatibility logic 209 may be used to facilitate dynamic communication and compatibility between various components, networks, computing devices, database(s) 225, and/or communication medium(s) 230, etc., and any number and type of other computing devices (such as wearable computing devices, mobile computing devices, desktop computers, server computing devices, etc.), processing devices (e.g., central processing unit (CPU), graphics processing unit (GPU), etc.), capturing/sensing components (e.g., non-visual data sensors/detectors, such as audio sensors, olfactory sensors, haptic sensors, signal sensors, vibration sensors, chemicals detectors, radio wave detectors, force sensors, weather/temperature sensors, body/biometric sensors, scanners, etc., and visual data sensors/detectors, such as cameras, etc.), user/context-awareness components and/or identification/verification sensors/devices (such as biometric sensors/detectors, scanners, etc.), memory or storage devices, data sources, and/or database(s) (such as data storage devices, hard drives, solid-state drives, hard disks, memory cards or devices, memory circuits, etc.), network(s) (e.g., Cloud network, Internet, Internet of Things, intranet, cellular network, proximity networks, such as Bluetooth, Bluetooth low energy (BLE), Bluetooth Smart, Wi-Fi proximity, Radio Frequency Identification, Near Field Communication, Body Area Network, etc.), wireless or wired communications and relevant protocols (e.g., Wi-Fi®, WiMAX, Ethernet, etc.), connectivity and location management techniques, software applications/websites, (e.g., social and/or business networking websites, business applications, games and other entertainment applications, etc.), programming languages, etc., while ensuring compatibility with changing technologies, parameters, protocols, standards, etc.

Throughout this document, terms like "logic", "component", "module", "framework", "engine", "tool", "circuitry", and/or the like, may be referenced interchangeably and include, by way of example, software, hardware, and/or any combination of software and hardware, such as firmware. In one example, "logic" may refer to or include a software component that works with one or more of an operating system, a graphics driver, etc., of a computing device, such as computing device 100. In another example, "logic" may refer to or include a hardware component that is capable of being physically installed along with or as part of one or more system hardware elements, such as an application processor, a graphics processor, etc., of a computing device, such as computing device 100. In yet another embodiment, "logic" may refer to or include a firmware component that is capable of being part of system firmware, such as firmware of an application processor or a graphics processor, etc., of a computing device, such as computing device 100.

Further, any use of a particular brand, word, term, phrase, name, and/or acronym, such as "object detection", "multi-camera", "real-time detection", "vertical line", "principal line", "person group", "person group center", "intersecting point", "ground plane", "line group mapping", "RealSense™ camera", "real-time", "automatic", "dynamic", "user interface", "camera", "sensor", "microphone", "display screen", "speaker", "verification", "authentication", "privacy", "user", "user profile", "user preference", "sender", "receiver", "personal device", "smart device", "mobile computer", "wearable device", "IoT device", "proximity network", "cloud network", "server computer", etc., should not be read to limit embodiments to software or devices that carry that label in products or in literature external to this document.

It is contemplated that any number and type of components may be added to and/or removed from detection mechanism 110 to facilitate various embodiments including adding, removing, and/or enhancing certain features. For brevity, clarity, and ease of understanding of detection mechanism 110, many of the standard and/or known components, such as those of a computing device, are not shown or discussed here. It is contemplated that embodiments, as described herein, are not limited to any technology, topology, system, architecture, and/or standard and are dynamic enough to adopt and adapt to any future changes.

Figure 3A:
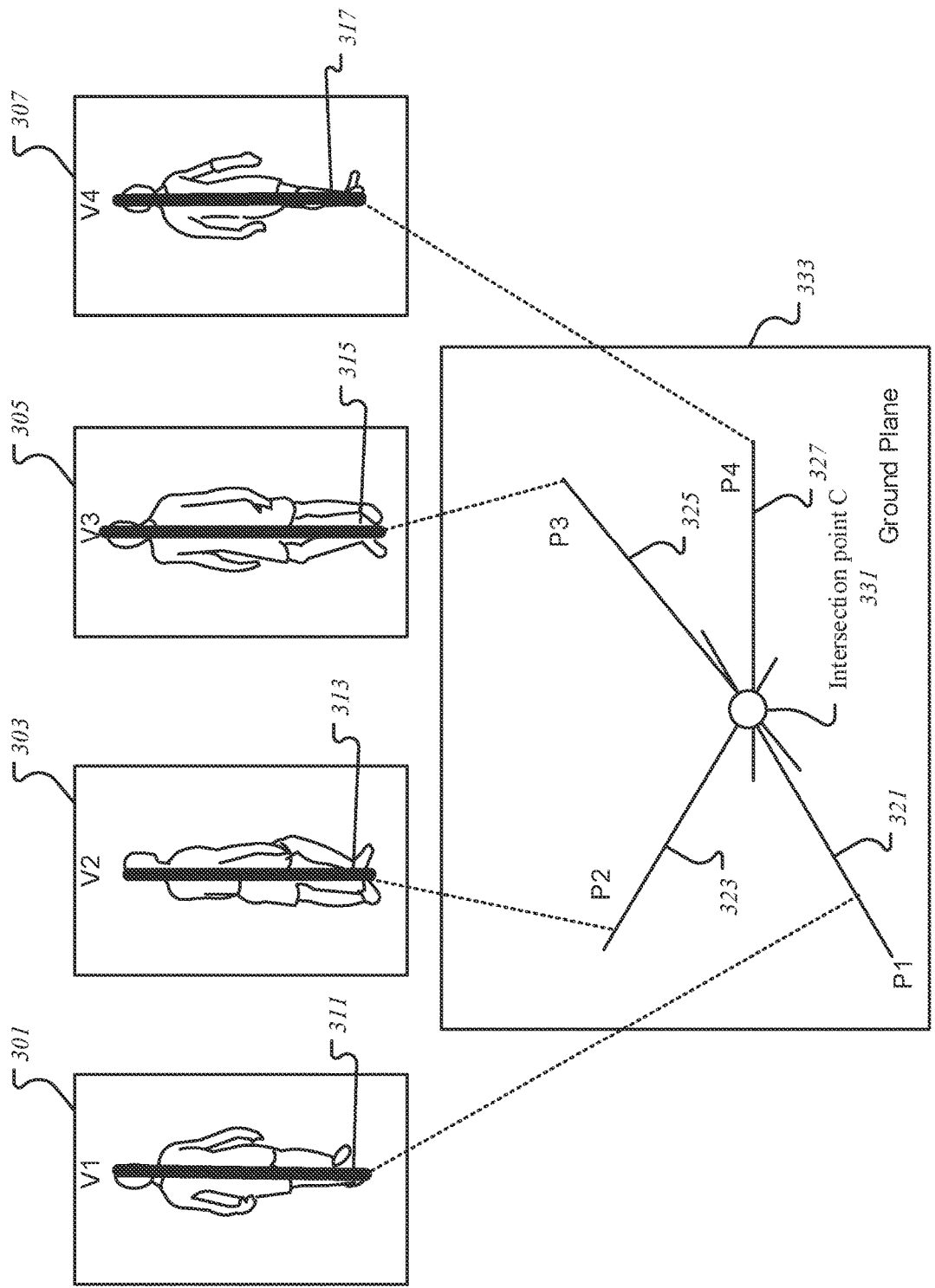
FIG. 3A illustrates a geographical relationship between principal lines according to one embodiment.
Figure 3B:
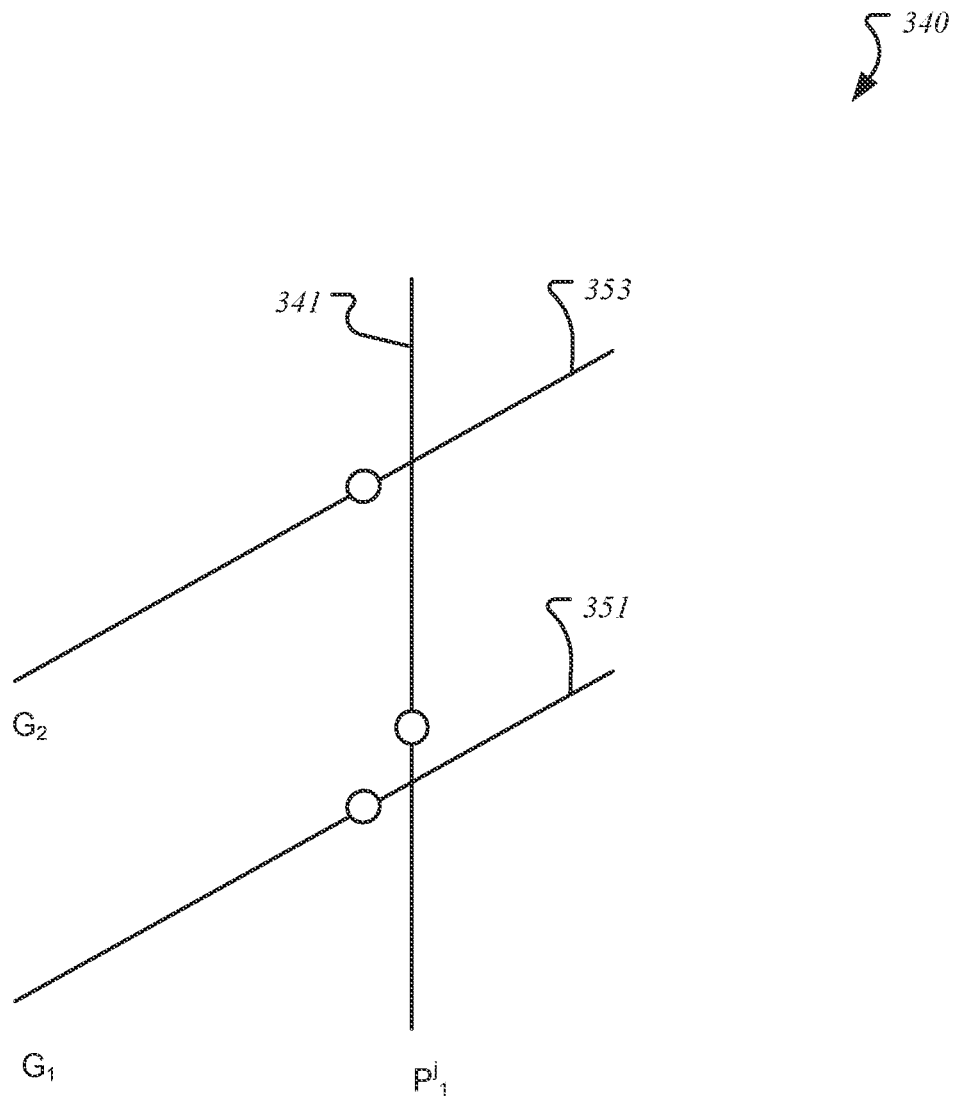
FIG. 3B illustrates a mapping of a principal line and object groups according to one embodiment.

FIG. 3A illustrates geographical relationship between principal lines 321, 323, 325, 327 according to one embodiment. For brevity, many of the details previously discussed with reference to FIGS. 1-2 may not be discussed or repeated hereafter. Any processes or transactions with this and other illustrations may be performed by processing logic that may comprise hardware (e.g., circuitry, dedicated logic, programmable logic, etc.), software (such as instructions run on a processing device), or a combination thereof, as facilitated by detection mechanism 110 of FIG. 1. Any processes or transactions associated with this and other illustrations may be illustrated or recited in linear sequences for brevity and clarity in presentation; however, it is contemplated that any number of them can be performed in parallel, asynchronously, or in different orders.

The illustrated embodiment illustrates four camera views 301, 303, 305, and 307 of the same person, where vertical lines V1 311, V2 313, V3 315, and V4 317 are defined as straight lines running though the center of the person from the top of the person's head all the way to the center of the person's each foot. Further, as illustrated, vertical line V1 311, V2 313, V3 315, and V4 317 are correspondingly mapped to principal lines P1 321, P2 323, P3 325, and P4 327 on ground plane 333, where principal lines P1 321, P2 323, P3 325, and P4 327 form a cluster intersecting at a point, such as intersection point C 331.

For example, if a person's feet are on the ground, then all different view points 301, 303, 305, 307 are likely to map to the same point in ground plane 33, such as intersection point C 331, which is the same point where all principal lines P1 321, P2 323, P3 325, and P4 327 intersect. These four intersecting principal lines P1 321, P2 323, P3 325, and P4 327 form a person group in ground plane 333. It is contemplated that there are always some inefficiencies in detection and homographic estimations that there are likely to be several intersection points associated with various cameras. In one embodiment, such inefficiencies are treated with computing a mean value of all such intersection points as facilitated by CRO logic 207 of FIG. 2, where this mean value of different intersection points may then be regarded as a group center.

Further, for example, a corresponding distance may be regarded as the distance between the foot center of the principal line and the group center divided by the length of the principal line. This may also be used to evaluate the relationship between each participant principal line and the corresponding person group. The less the distance between a principal line and a person group, the more likely the principal line belongs to the person group.

As described earlier, embodiments are not limited to persons or person groups and that they may involve other objects, such as trees, and their corresponding object groups, such as tree groups.

FIG. 3B illustrates a mapping 340 of principal line 341 and object groups 351, 353 according to one embodiment. For brevity, many of the details previously discussed with reference to FIGS. 1-3A may not be discussed or repeated hereafter. As illustrated in mapping 340, a single principal line $P^j_1$ 341 from a camera, such as camera j, intersects with two object groups, such as person groups $G_1$ 351 and $G_2$ 353. The correspondence distance of $[G_1, P^j_1]$ between group 351 and principal line 341 is smaller than $[G_2, P^j_1]$ between group 353 and principal line 341 and thus $[G_1, P^j_1]$ has the correspondence and represents the same object, such as a person, in views from these two cameras, and accordingly, principal line 341 $P^j_1$ is regarded as being associated with the new group $G_1$ 351 consisting two principal lines now. Further, the new group center for $G_1$ 351 is updated by using the mean of all intersection points in the same group. Moreover, if there are any isolated principal lines from a second camera without any intersecting with existing groups, then it may by default form a new group.

Figure 3C:
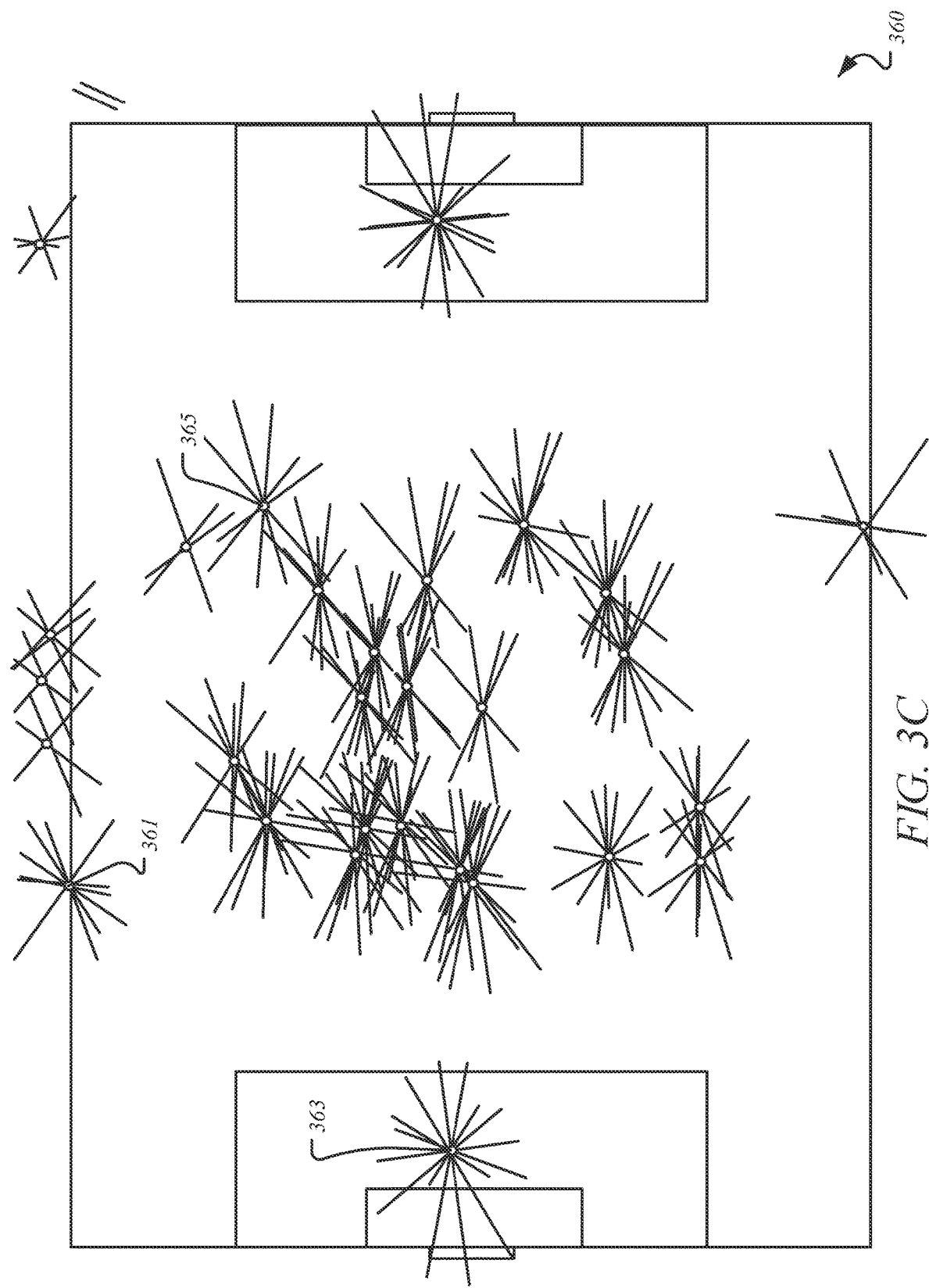
FIG. 3C illustrates a final output according to one embodiment.

FIG. 3C illustrates final output 360 according to one embodiment. For brevity, many of the details previously discussed with reference to FIGS. 1-3B may not be discussed or repeated hereafter. The illustrated embodiment shows results 360 where all persons, such as players, referees, etc., on a soccer field are identified according to their exact positions on the ground. For brevity, three intersection points 361, 363, 365 are selected show the positions of various individuals, such as intersection point 361 may represent the exact position of a referee in the soccer match, intersection point 363 represents a goalkeeper, while intersection point 365 represents a player. In one embodiment, each of intersection points 361, 363, 365 also represents a cluster of principle lines, as further described with reference to FIGS. 2 and 3A, in a multi-camera, multi-view object detection technique as facilitated by detection mechanism 110 of FIG. 1.

FIG. 4 illustrates an embodiment of a method 400 for performing a real-time multi-view, multi-camera detection of objects according to one embodiment. Since FIG. 4 has already been described above with reference to FIG. 2, for brevity, those details are not discussed or repeated hereafter. However, it is to be noted that any processes or transactions associated with this and other illustrations may be performed by processing logic that may comprise hardware (e.g., circuitry, dedicated logic, programmable logic, etc.), software (such as instructions run on a processing device), or a combination thereof, as facilitated by detection mechanism 110 of FIG. 1. Further, any processes or transactions associated with this and other illustrations may be illustrated or recited in linear sequences for brevity and clarity in presentation; however, it is contemplated that any number of them can be performed in parallel, asynchronously, or in different orders.

Figure 5:
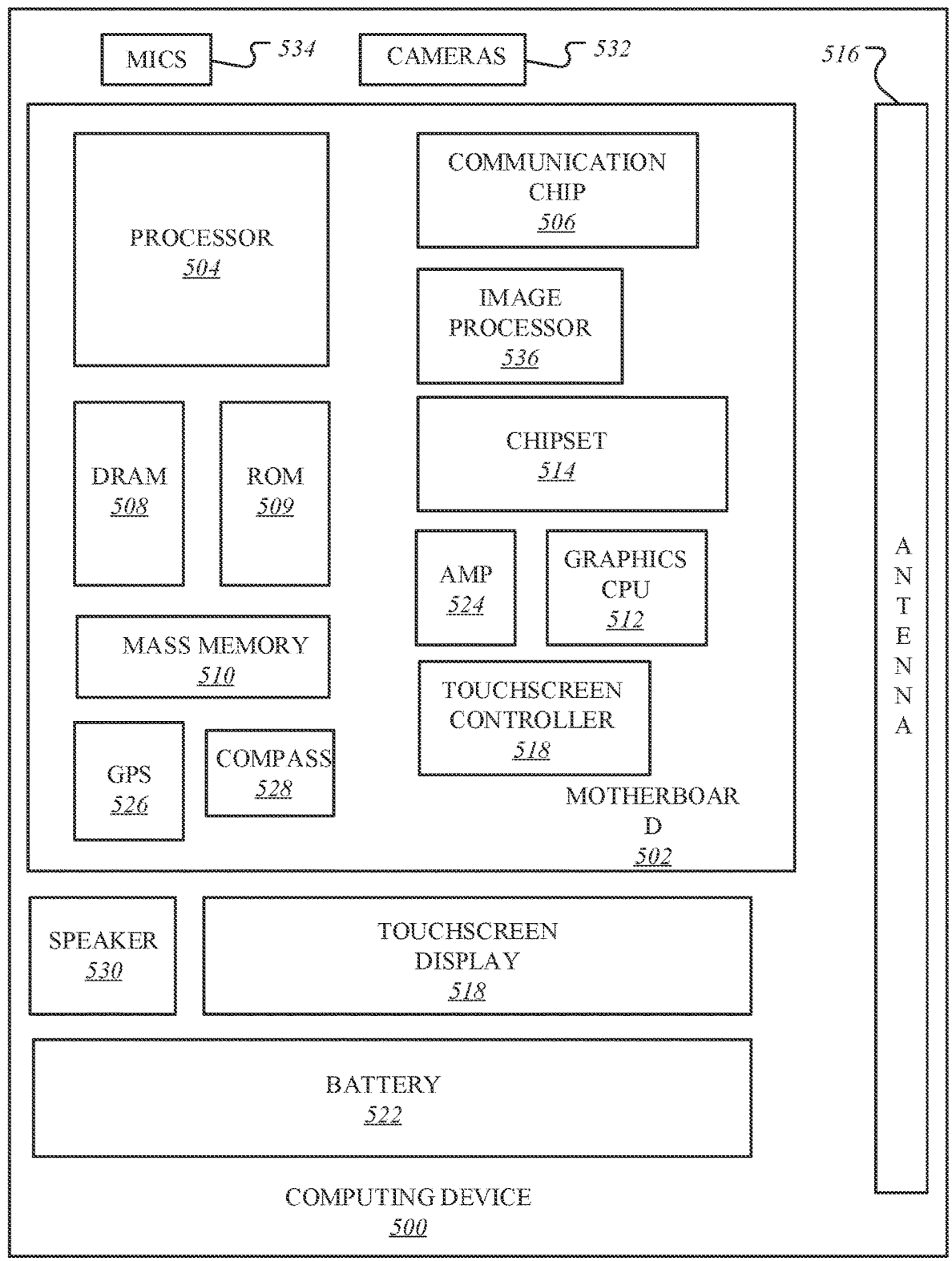
FIG. 5 illustrates a computer device capable of supporting and implementing one or more embodiments according to one embodiment.

FIG. 5 illustrates a computing device 500 in accordance with one implementation. The illustrated computing device 500 may be same as or similar to computing device 100 of FIG. 1. The computing device 500 houses a system board 502. The board 502 may include a number of components, including but not limited to a processor 504 and at least one communication package 506. The communication package is coupled to one or more antennas 516. The processor 504 is physically and electrically coupled to the board 502.

Depending on its applications, computing device 500 may include other components that may or may not be physically and electrically coupled to the board 502. These other components include, but are not limited to, volatile memory (e.g., DRAM) 508, non-volatile memory (e.g., ROM) 509, flash memory (not shown), a graphics processor 512, a digital signal processor (not shown), a crypto processor (not shown), a chipset 514, an antenna 516, a display 518 such as a touchscreen display, a touchscreen controller 520, a battery 522, an audio codec (not shown), a video codec (not shown), a power amplifier 524, a global positioning system (GPS) device 526, a compass 528, an accelerometer (not shown), a gyroscope (not shown), a speaker 530, cameras 532, a microphone array 534, and a mass storage device (such as hard disk drive) 510, compact disk (CD) (not shown), digital versatile disk (DVD) (not shown), and so forth). These components may be connected to the system board 502, mounted to the system board, or combined with any of the other components.

The communication package 506 enables wireless and/or wired communications for the transfer of data to and from the computing device 500. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 506 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 500 may include a plurality of communication packages 506. For instance, a first communication package 506 may be dedicated to shorter range wireless communications such as Wi-Fi and Bluetooth and a second communication package 506 may be dedicated to longer range wireless communications such as GPS, EDGE, GPRS, CDMA, WiMAX, LTE, Ev-DO, and others.

The cameras 532 including any depth sensors or proximity sensor are coupled to an optional image processor 536 to perform conversions, analysis, noise reduction, comparisons, depth or distance analysis, image understanding, and other processes as described herein. The processor 504 is coupled to the image processor to drive the process with interrupts, set parameters, and control operations of image processor and the cameras. Image processing may instead be performed in the processor 504, the graphics CPU 512, the cameras 532, or in any other device.

In various implementations, the computing device 500 may be a laptop, a netbook, a notebook, an ultrabook, a smartphone, a tablet, a personal digital assistant (PDA), an ultra mobile PC, a mobile phone, a desktop computer, a server, a set-top box, an entertainment control unit, a digital camera, a portable music player, or a digital video recorder. The computing device may be fixed, portable, or wearable. In further implementations, the computing device 500 may be any other electronic device that processes data or records data for processing elsewhere.

Embodiments may be implemented using one or more memory chips, controllers, CPUs (Central Processing Unit), microchips or integrated circuits interconnected using a motherboard, an application specific integrated circuit (ASIC), and/or a field programmable gate array (FPGA). The term "logic" may include, by way of example, software or hardware and/or combinations of software and hardware.

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Embodiments may be provided, for example, as a computer program product which may include one or more transitory or non-transitory machine-readable storage media having stored thereon machine-executable instructions that, when executed by one or more machines such as a computer, network of computers, or other electronic devices, may result in the one or more machines carrying out operations in accordance with embodiments described herein. A machine-readable medium may include, but is not limited to, floppy diskettes, optical disks, CD-ROMs (Compact Disc-Read Only Memories), and magneto-optical disks, ROMs, RAMs, EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Figure 6:
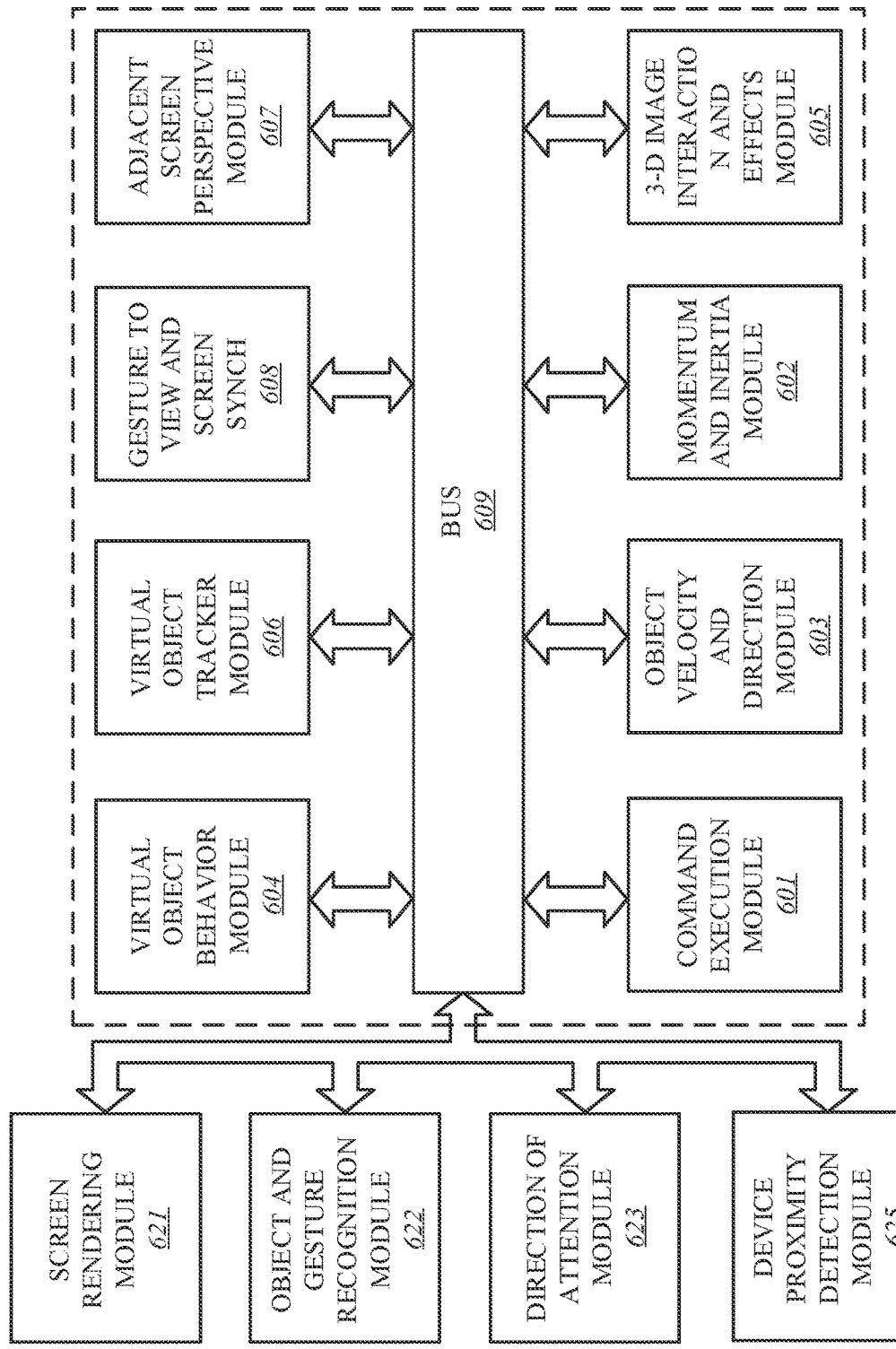
FIG. 6 illustrates an embodiment of a computing environment capable of supporting and implementing one or more embodiments according to one embodiment.

FIG. 6 illustrates an embodiment of a computing environment 600 capable of supporting the operations discussed above. The modules and systems can be implemented in a variety of different hardware architectures and form factors including that shown in FIG. 5.

The Command Execution Module 601 includes a central processing unit to cache and execute commands and to distribute tasks among the other modules and systems shown. It may include an instruction stack, a cache memory to store intermediate and final results, and mass memory to store applications and operating systems. The Command Execution Module may also serve as a central coordination and task allocation unit for the system.

The Screen Rendering Module 621 draws objects on the one or more multiple screens for the user to see. It can be adapted to receive the data from the Virtual Object Behavior Module 604, described below, and to render the virtual object and any other objects and forces on the appropriate screen or screens. Thus, the data from the Virtual Object Behavior Module would determine the position and dynamics of the virtual object and associated gestures, forces and objects, for example, and the Screen Rendering Module would depict the virtual object and associated objects and environment on a screen, accordingly. The Screen Rendering Module could further be adapted to receive data from the Adjacent Screen Perspective Module 607, described below, to either depict a target landing area for the virtual object if the virtual object could be moved to the display of the device with which the Adjacent Screen Perspective Module is associated. Thus, for example, if the virtual object is being moved from a main screen to an auxiliary screen, the Adjacent Screen Perspective Module 2 could send data to the Screen Rendering Module to suggest, for example in shadow form, one or more target landing areas for the virtual object on that track to a user's hand movements or eye movements.

The Object and Gesture Recognition Module 622 may be adapted to recognize and track hand and arm gestures of a user. Such a module may be used to recognize hands, fingers, finger gestures, hand movements and a location of hands relative to displays. For example, the Object and Gesture Recognition Module could for example determine that a user made a body part gesture to drop or throw a virtual object onto one or the other of the multiple screens, or that the user made a body part gesture to move the virtual object to a bezel of one or the other of the multiple screens. The Object and Gesture Recognition System may be coupled to a camera or camera array, a microphone or microphone array, a touch screen or touch surface, or a pointing device, or some combination of these items, to detect gestures and commands from the user.

The touch screen or touch surface of the Object and Gesture Recognition System may include a touch screen sensor. Data from the sensor may be fed to hardware, software, firmware or a combination of the same to map the touch gesture of a user's hand on the screen or surface to a corresponding dynamic behavior of a virtual object. The sensor date may be used to momentum and inertia factors to allow a variety of momentum behavior for a virtual object based on input from the user's hand, such as a swipe rate of a user's finger relative to the screen. Pinching gestures may be interpreted as a command to lift a virtual object from the display screen, or to begin generating a virtual binding associated with the virtual object or to zoom in or out on a display. Similar commands may be generated by the Object and Gesture Recognition System using one or more cameras without the benefit of a touch surface.

The Direction of Attention Module 623 may be equipped with cameras or other sensors to track the position or orientation of a user's face or hands. When a gesture or voice command is issued, the system can determine the appropriate screen for the gesture. In one example, a camera is mounted near each display to detect whether the user is facing that display. If so, then the direction of attention module information is provided to the Object and Gesture Recognition Module 622 to ensure that the gestures or commands are associated with the appropriate library for the active display. Similarly, if the user is looking away from all of the screens, then commands can be ignored.

The Device Proximity Detection Module 625 can use proximity sensors, compasses, GPS (global positioning system) receivers, personal area network radios, and other types of sensors, together with triangulation and other techniques to determine the proximity of other devices. Once a nearby device is detected, it can be registered to the system and its type can be determined as an input device or a display device or both. For an input device, received data may then be applied to the Object Gesture and Recognition Module 622. For a display device, it may be considered by the Adjacent Screen Perspective Module 607.

The Virtual Object Behavior Module 604 is adapted to receive input from the Object Velocity and Direction Module, and to apply such input to a virtual object being shown in the display. Thus, for example, the Object and Gesture Recognition System would interpret a user gesture and by mapping the captured movements of a user's hand to recognized movements, the Virtual Object Tracker Module would associate the virtual object's position and movements to the movements as recognized by Object and Gesture Recognition System, the Object and Velocity and Direction Module would capture the dynamics of the virtual object's movements, and the Virtual Object Behavior Module would receive the input from the Object and Velocity and Direction Module to generate data that would direct the movements of the virtual object to correspond to the input from the Object and Velocity and Direction Module.

The Virtual Object Tracker Module 606 on the other hand may be adapted to track where a virtual object should be located in three-dimensional space in a vicinity of a display, and which body part of the user is holding the virtual object, based on input from the Object and Gesture Recognition Module. The Virtual Object Tracker Module 606 may for example track a virtual object as it moves across and between screens and track which body part of the user is holding that virtual object. Tracking the body part that is holding the virtual object allows a continuous awareness of the body part's air movements, and thus an eventual awareness as to whether the virtual object has been released onto one or more screens.

The Gesture to View and Screen Synchronization Module 608, receives the selection of the view and screen or both from the Direction of Attention Module 623 and, in some cases, voice commands to determine which view is the active view and which screen is the active screen. It then causes the relevant gesture library to be loaded for the Object and Gesture Recognition Module 622. Various views of an application on one or more screens can be associated with alternative gesture libraries or a set of gesture templates for a given view. As an example, in FIG. 1A, a pinch-release gesture launches a torpedo, but in FIG. 1B, the same gesture launches a depth charge.

The Adjacent Screen Perspective Module 607, which may include or be coupled to the Device Proximity Detection Module 625, may be adapted to determine an angle and position of one display relative to another display. A projected display includes, for example, an image projected onto a wall or screen. The ability to detect a proximity of a nearby screen and a corresponding angle or orientation of a display projected therefrom may for example be accomplished with either an infrared emitter and receiver, or electromagnetic or photo-detection sensing capability. For technologies that allow projected displays with touch input, the incoming video can be analyzed to determine the position of a projected display and to correct for the distortion caused by displaying at an angle. An accelerometer, magnetometer, compass, or camera can be used to determine the angle at which a device is being held while infrared emitters and cameras could allow the orientation of the screen device to be determined in relation to the sensors on an adjacent device. The Adjacent Screen Perspective Module 607 may, in this way, determine coordinates of an adjacent screen relative to its own screen coordinates. Thus, the Adjacent Screen Perspective Module may determine which devices are in proximity to each other, and further potential targets for moving one or more virtual objects across screens. The Adjacent Screen Perspective Module may further allow the position of the screens to be correlated to a model of three-dimensional space representing all of the existing objects and virtual objects.

The Object and Velocity and Direction Module 603 may be adapted to estimate the dynamics of a virtual object being moved, such as its trajectory, velocity (whether linear or angular), momentum (whether linear or angular), etc. by receiving input from the Virtual Object Tracker Module. The Object and Velocity and Direction Module may further be adapted to estimate dynamics of any physics forces, by for example estimating the acceleration, deflection, degree of stretching of a virtual binding, etc. and the dynamic behavior of a virtual object once released by a user's body part. The Object and Velocity and Direction Module may also use image motion, size and angle changes to estimate the velocity of objects, such as the velocity of hands and fingers The Momentum and Inertia Module 602 can use image motion, image size, and angle changes of objects in the image plane or in a three-dimensional space to estimate the velocity and direction of objects in the space or on a display. The Momentum and Inertia Module is coupled to the Object and Gesture Recognition Module 622 to estimate the velocity of gestures performed by hands, fingers, and other body parts and then to apply those estimates to determine momentum and velocities to virtual objects that are to be affected by the gesture.

The 3D Image Interaction and Effects Module 605 tracks user interaction with 3D images that appear to extend out of one or more screens. The influence of objects in the z-axis (towards and away from the plane of the screen) can be calculated together with the relative influence of these objects upon each other. For example, an object thrown by a user gesture can be influenced by 3D objects in the foreground before the virtual object arrives at the plane of the screen. These objects may change the direction or velocity of the projectile or destroy it entirely. The object can be rendered by the 3D Image Interaction and Effects Module in the foreground on one or more of the displays. As illustrated, various components, such as components 601, 602, 603, 604, 605. 606, 607, and 608 are connected via an interconnect or a bus, such as bus 609.

The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system for facilitating hybrid communication according to embodiments and examples described herein.

Some embodiments pertain to Example 1 that includes an apparatus to facilitate real-time multi-view detection of objects in multi-camera environments, the apparatus comprising: one or more processors to: one or more processors to: map first lines associated with objects to a ground plane; and form clusters of second lines corresponding to the first lines such that an intersection point in a cluster represents a position of an object on the ground plane.

Example 2 includes the subject matter of Example 1, wherein the one or more processors are further to generate the first lines to represent the objects such that a first line runs vertically from top to bottom of an object, wherein the first lines include vertical lines, and wherein the objects include one or more of persons, other living beings, and not living things.

Example 3 includes the subject matter of Examples 1-2, wherein the second lines intersection to generate clusters having intersection points, where each cluster represents an object group, and wherein the second lines includes principal lines.

Example 4 includes the subject matter of Examples 1-3, wherein the one or more processors are further to facilitate cameras to capture scenes having images of the objects, wherein a camera offers an input based on its capture of a scene of one or more of the objects, wherein the input represents a view of the one or more object from the camera's perspective.

Example 5 includes the subject matter of Examples 1-4, wherein the one or more processors are further to; detect whether the second lines include an isolated second line; if the isolated second line is detected, create a new object group to assign the isolated second line is assigned to the new object group; and if the isolated second line is not detected, assign the second lines to object groups.

Example 6 includes the subject matter of Examples 1-5, wherein the one or more processors are further to: compute group centers for the object groups; and output positions of the objects within the group plane based on the group centers.

Example 7 includes the subject matter of Examples 1-6, wherein the one or more processors comprise one or more of a graphics processor and an application processor, wherein the graphics processor and the application processor are co-located on a common semiconductor Some embodiments pertain to Example 8 that includes a method facilitating real-time multi-view detection of objects in multi-camera environments, the method comprising: mapping first lines associated with objects to a ground plane; and forming clusters of second lines corresponding to the first lines such that an intersection point in a cluster represents a position of an object on the ground plane.

Example 9 includes the subject matter of Example 8, further comprising generating the first lines to represent the objects such that a first line runs vertically from top to bottom of an object, wherein the first lines include vertical lines, and wherein the objects include one or more of persons, other living beings, and not living things.

Example 10 includes the subject matter of Examples 8-9, wherein the second lines intersection to generate clusters having intersection points, where each cluster represents an object group, and wherein the second lines includes principal lines.

Example 11 includes the subject matter of Examples 8-10, further comprising facilitating cameras to capture scenes having images of the objects, wherein a camera offers an input based on its capture of a scene of one or more of the objects, wherein the input represents a view of the one or more object from the camera's perspective.

Example 12 includes the subject matter of Examples 8-11, further comprising: detecting whether the second lines include an isolated second line; if the isolated second line is detected, creating a new object group to assign the isolated second line is assigned to the new object group; and if the isolated second line is not detected, assigning the second lines to object groups.

Example 13 includes the subject matter of Examples 8-12, further comprising: compute group centers for the object groups; and output positions of the objects within the group plane based on the group centers.

Example 14 includes the subject matter of Examples 8-13, wherein the method is facilitated by one or more processors comprising one or more of a graphics processor and an application processor, wherein the graphics processor and the application processor are co-located on a common semiconductor package.

Some embodiments pertain to Example 15 that includes a data processing system comprising a processing device to: map first lines associated with objects to a ground plane; and form clusters of second lines corresponding to the first lines such that an intersection point in a cluster represents a position of an object on the ground plane.

Example 16 includes the subject matter of Example 15, wherein the processing device is further to generate the first lines to represent the objects such that a first line runs vertically from top to bottom of an object, wherein the first lines include vertical lines, and wherein the objects include one or more of persons, other living beings, and not living things.

Example 17 includes the subject matter of Examples 15-16, wherein the second lines intersection to generate clusters having intersection points, where each cluster represents an object group, and wherein the second lines includes principal lines.

Example 18 includes the subject matter of Examples 15-17, wherein the processing device is further to facilitate cameras to capture scenes having images of the objects, wherein a camera offers an input based on its capture of a scene of one or more of the objects, wherein the input represents a view of the one or more object from the camera's perspective.

Example 19 includes the subject matter of Examples 15-18, wherein the processing device is further to: detect whether the second lines include an isolated second line; if the isolated second line is detected, create a new object group to assign the isolated second line is assigned to the new object group; and if the isolated second line is not detected, assign the second lines to object groups.

Example 20 includes the subject matter of Examples 15-19, wherein the processing device is further to: compute group centers for the object groups; and output positions of the objects within the group plane based on the group centers.

Example 21 includes the subject matter of Examples 15-20, wherein the processing device comprises one or more of a graphics processor and an application processor, wherein the graphics processor and the application processor are co-located on a common semiconductor package.

Some embodiments pertain to Example 22 that includes an apparatus facilitating real-time multi-view detection of objects in multi-camera environments, the apparatus comprising: means for mapping first lines associated with objects to a ground plane; and means for forming clusters of second lines corresponding to the first lines such that an intersection point in a cluster represents a position of an object on the ground plane.

Example 23 includes the subject matter of Example 22, further comprising means for generating the first lines to represent the objects such that a first line runs vertically from top to bottom of an object, wherein the first lines include vertical lines, and wherein the objects include one or more of persons, other living beings, and not living things.

Example 24 includes the subject matter of Examples 22-23, wherein the second lines intersection to generate clusters having intersection points, where each cluster represents an object group, and wherein the second lines includes principal lines.

Example 25 includes the subject matter of Examples 22-24, further comprising facilitating cameras to capture scenes having images of the objects, wherein a camera offers an input based on its capture of a scene of one or more of the objects, wherein the input represents a view of the one or more object from the camera's perspective.

Example 26 includes the subject matter of Examples 22-25, further comprising: means for detecting whether the second lines include an isolated second line; if the isolated second line is detected, means for creating a new object group to assign the isolated second line is assigned to the new object group; and if the isolated second line is not detected, means for assigning the second lines to object groups.

Example 27 includes the subject matter of Examples 22-26, further comprising: means for computing group centers for the object groups; and means for outputting positions of the objects within the group plane based on the group centers.

Example 28 includes the subject matter of Examples 22-27, further comprising one or more processors including one or more of a graphics processor and an application processor, wherein the graphics processor and the application processor are co-located on a common semiconductor package.

Example 29 includes at least one non-transitory or tangible machine-readable medium comprising a plurality of instructions, when executed on a computing device, to implement or perform a method as claimed in any of claims or examples 8-14.

Example 30 includes at least one machine-readable medium comprising a plurality of instructions, when executed on a computing device, to implement or perform a method as claimed in any of claims or examples 8-14.

Example 31 includes a system comprising a mechanism to implement or perform a method as claimed in any of claims or examples 8-14.

Example 32 includes an apparatus comprising means for performing a method as claimed in any of claims or examples 8-14.

Example 33 includes a computing device arranged to implement or perform a method as claimed in any of claims or examples 8-14.

Example 34 includes a communications device arranged to implement or perform a method as claimed in any of claims or examples 8-14.

Example 35 includes at least one machine-readable medium comprising a plurality of instructions, when executed on a computing device, to implement or perform a method or realize an apparatus as claimed in any preceding claims.

Example 36 includes at least one non-transitory or tangible machine-readable medium comprising a plurality of instructions, when executed on a computing device, to implement or perform a method or realize an apparatus as claimed in any preceding claims.

Example 37 includes a system comprising a mechanism to implement or perform a method or realize an apparatus as claimed in any preceding claims.

Example 38 includes an apparatus comprising means to perform a method as claimed in any preceding claims.

Example 39 includes a computing device arranged to implement or perform a method or realize an apparatus as claimed in any preceding claims.

Example 40 includes a communications device arranged to implement or perform a method or realize an apparatus as claimed in any preceding claims.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

What is claimed is:

1. An apparatus comprising:
one or more processors coupled to memory, the one or more processors to:
map first lines associated with one or more objects to a ground plane based on group centers corresponding to object groups; and
form clusters of second lines corresponding to the first lines such that an intersection point between a first line and a second line in a cluster represents a position of an object on the ground plane, wherein the clusters represent the object groups, wherein an object group is created as represented by the cluster if the second line is detected as an isolated second line such that the isolated second line is assigned to the object group.

2. The apparatus of claim 1, wherein the one or more processors are further to facilitate one or more cameras to capture one or more scenes having one or more images of the one or more objects, wherein a camera offers an input based on its capture of a scene of the one or more objects, wherein the input represents a view of the one or more objects from a perspective of the camera.

3. The apparatus of claim 1, wherein the one or more processors are further to:
detect whether the second lines include an isolated second line; and
if the isolated second line is not detected, assign the second lines to the object groups wherein the first line runs vertically with respect to the object, and wherein the object includes one or more of a living being or a non-living thing.

4. The apparatus of claim 1, wherein the one or more processors are further to:
compute group centers for the object groups; and
output positions of the one or more objects associated with the group plane based on the group centers.

5. The apparatus of claim 1, wherein the one or more processors comprise one or more graphics processor or one or more application processors, wherein the one or more graphics processors are co-located with the one or more application processors on a common semiconductor package.

6. A method comprising:
mapping, by one or more processors of a computing device, first lines associated with one or more objects to a ground plane based on group centers corresponding to object groups; and
forming clusters of second lines corresponding to the first lines such that an intersection point between a first line and a second line in a cluster represents a position of an object on the ground plane, wherein the clusters represent the object groups, wherein an object group is created as represented by the cluster if the second line is detected as an isolated second line such that the isolated second line is assigned to the object group.

7. The method of claim 6, further comprising facilitating one or more cameras to capture one or more scenes having one or more images of the one or more objects, wherein a camera offers an input based on its capture of a scene of the one or more objects, wherein the input represents a view of the one or more objects from the a perspective of the camera.

8. The method of claim 6, further comprising:
detecting whether the second lines include an isolated second line; and
if the isolated second line is not detected, assigning the second lines to the object groups wherein the first line runs vertically with respect to the object, and wherein the object includes one or more of a living being or a non-living thing.

9. The method of claim 6, further comprising:
computing group centers for the object groups; and
outputting positions of the one or more objects associated with the group plane based on the group centers.

10. The method of claim 6, wherein the one or more processors comprise one or more graphics processor or one or more application processors, wherein the one or more graphics processors are co-located with the one or more application processors on a common semiconductor package.

11. A non-transitory computer-readable medium having stored thereon instructions which, when executed, cause a computing device to perform operations comprising:
mapping first lines associated with one or more objects to a ground plane based on group centers corresponding to object groups; and
forming clusters of second lines corresponding to the first lines such that an intersection point between a first line and a second line in a cluster represents a position of an object on the ground plane, wherein the clusters represent the object groups, wherein an object group is created as represented by the cluster if the second line is detected as an isolated second line such that the isolated second line is assigned to the object group.

12. The non-transitory computer-readable medium of claim 11, wherein the operations further comprise facilitating one or more cameras to capture one or more scenes having one or more images of the one or more objects, wherein a camera offers an input based on its capture of a scene of the one or more objects, wherein the input represents a view of the one or more objects from the a perspective of the camera.

13. The non-transitory computer-readable medium of claim 11, wherein the operations further comprise:
   detecting whether the second lines include an isolated second line; and
   if the isolated second line is not detected, assigning the second lines to the object groups wherein the first line runs vertically with respect to the object, and wherein the object includes one or more of a living being or a non-living thing.

14. The non-transitory computer-readable medium of claim 11, wherein the operations further comprise:
   computing group centers for the object groups; and
   outputting positions of the one or more objects associated with the group plane based on the group centers.

15. The non-transitory computer-readable medium of claim 11, wherein the computing device comprises one or more processors having one or more graphics processor or one or more application processors, wherein the one or more graphics processors are co-located with the one or more application processors on a common semiconductor package.

* * * * *